United States Patent Office 3,614,809
Patented Oct. 26, 1971

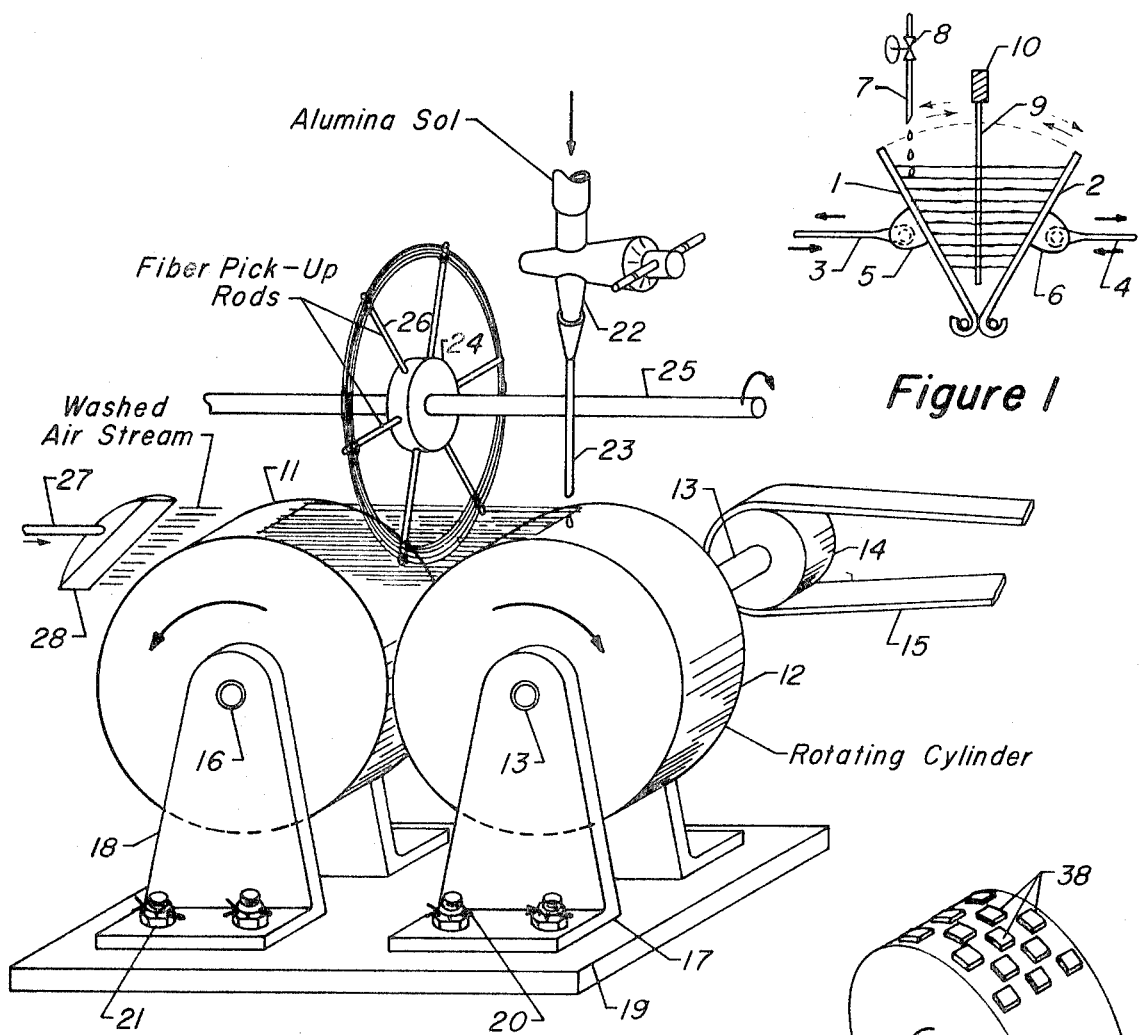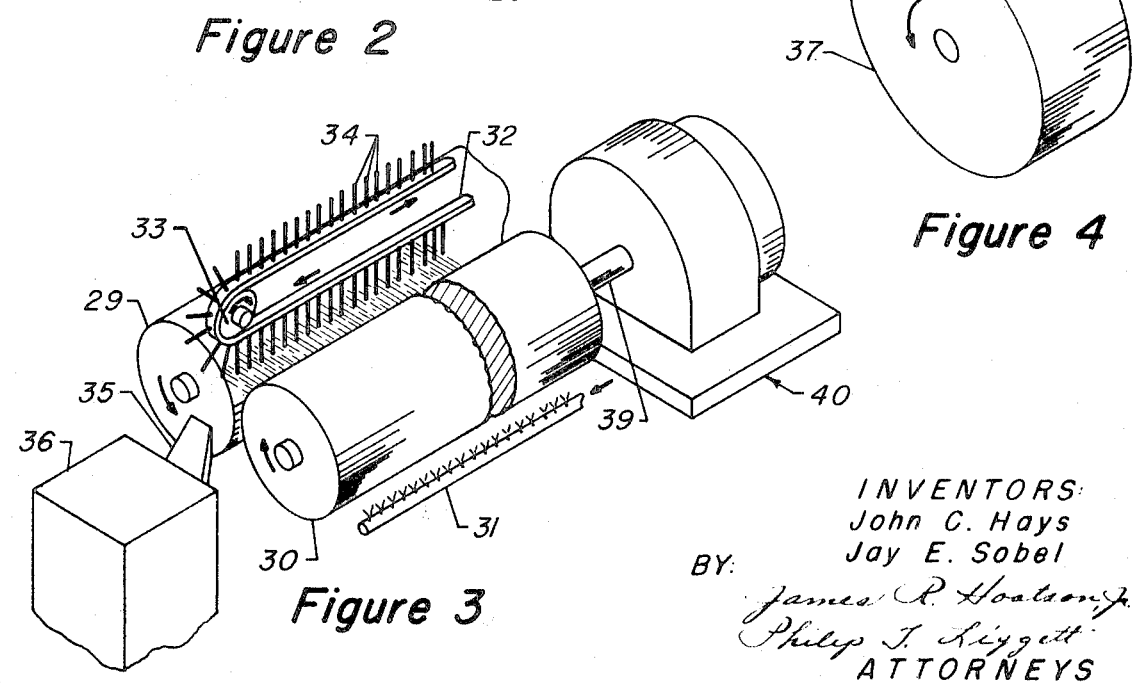

3,614,809
MEANS FOR PRODUCING HIGH SURFACE
AREA FIBERS
John C. Hayes, Palatine, and Jay E. Sobel, Des Plaines, Ill., assignors to Universal Oil Products Company, Des Plaines, Ill.
Filed Dec. 27, 1968, Ser. No. 787,358
Int. Cl. D01d 1/00
U.S. Cl. 18—8
4 Claims

ABSTRACT OF THE DISCLOSURE

Means for continuously producing small diameter fibers of an inorganic oxide material, such as alumina, by feeding a viscous sol of the material onto the surface of at least one of a set of "drawing" surfaces and then causing the meeting and withdrawal of such surfaces to effect the formation of filaments of semi-set sol. The resulting filaments of fibers are preferably continuously collected from between the "drawing" surfaces by mechanically moving rod means that are positioned to pass between such surfaces.

The present invention relates to means for continuously producing small diameter, large surface area fibers of a refractory inorganic oxide. More particularly, the invention relates to a system which provides for feeding a hydrosol to a set of drawing surfaces, effecting the continuous meeting and withdrawal of such surfaces to draw fine, flexible fibers of semi-set sol, and then continuously removing the resulting fibers from between the surfaces.

It is recognized that various means have been used for pulling and forming fibers from a surface. However, known systems have not satisfactorily provided for the continuous formation of resulting flexible, small diameter and large surface area fibers. In addition, it should be noted that there are various processing conditions which can critically affect the formation of a desired type of filament or fiber. For example, temperature, humidity, viscosity and, more particularly, the preparation of the sol can have an effect upon the type of flexible fibers which will result from the drawing system.

The filaments, or fibers, which are prepared by the present system may be used as a catalyst or catalyst support material because of their high porosity and high surface area; however, it is not intended to imply that this is their only usage, for the refractory inorganic oxide fibers of this invention can well be used as tensile or abrasion reinforcing materials for plastic and resin articles. Also, the fibers may be used for fillers and/or insulators against heat or sound in various construction materials.

While the present system may be used to special advantage for producing alumina fibers it is to be noted that such system is not to be limited to only the production of this one material. In other words, the inorganic hydrosol filaments may be made from other gelable hydrous sols; as for example: chromia sol, magnesia sol, silica sol, thoria sol and the like, and also the various combinations thereof. The sols generally result from the concentration of one or more appropriate hydrolyzed or hydrolyzable metal salts so as to provide, in effect, a colloidal dispersion which is stable in the remaining liquid.

In one aspect, it may be considered a principal object of the present invention to provide an improved method for continuously forming small diameter (in the 5 to 25 micron range) and, generally, large surface area filaments of a refractory inorganic oxide.

It may be considered a further object of the invention to provide an improved continuously operating system which will have means for continuously removing the fine filaments from between the moving fiber drawing surfaces.

In one embodiment, the present invention provides a method for continuously producing porous, long filament fibers of an inorganic oxide with a diameter of less than 25 microns, which comprises the steps of feeding a viscous in organic oxide sol onto the face of at least one of a set of meeting surfaces and causing the continuous meeting and withdrawal thereof to thereby effect the drawing and forming of filaments of semi-set inorganic oxide sol therefrom as such surfaces move away from each other effecting the further drawing and collection of semi-rigid fibers around moving projection means, such means positioned and moved laterally across the pulled fibers from said set of surfaces, and removing from said projection means, resulting drawn inorganic oxide fibers of non-friable nature which are in an amorphous state.

Fibers formed in accordance with the present system will be amorphous and have a total surface area, internal and external, of at least about 70 m.$^2$/g., unless extremely high calcination temperatures are utilized.

In general, it is necessary that the sol or "drawing stock" be viscous and tacky. In addition, it appears that the filaments cannot be extruded and must be drawn under tension conditions to achieve the necessary fineness or small diameter fiber range. Thus, the sol mixture is concentrated to form a viscous tacky sol which may be characterized by having a viscosity of from about 1 to about 1,000 poises.

As one means of effecting the concentration of the sol material and attaining a tacky or viscous characteristic there may be the distribution of the hydrosol onto a drawing surface as a thin film within a controlled atmosphere that is carefully controlled to have a proper humidity and temperature. Where large surface area drawing surfaces are utilized there will be a relatively rapid evaporation from the hydrosol and it may be necessary to obtain a humidified air content within the drawing zone so that the moisture does not leave the surfaces or the hydrosol fibers too rapidly. On the other hand, if the moisture content becomes too high, then a desired rate of evaporation will not occur and the drawn fiber may in fact absorb a certain amount of moisture which will effect the collapse of the filament or fiber. Generally, the fiberizing environment will have a relative humidity of less than about 90% and preferably in the range of 20% to about 60%. The temperature of the environment of the drawing zone is believed to be somewhat less critical and may be in the range of from about 5° to about 90° C., but generally within the range of from about 25° to about 50° C.

Inasmuch as it is desired to provide for a continuous formation of the highly porous large surface area filaments in an amorphous state, a generally preferred method of production will embody the use of opposing drum surfaces which will be positioned in a tangential and abutting relationship so that there is the constant meeting and withdrawing of opposing surface sections as the drum units are rotated in opposing directions. The hydrosol can be fed down onto the surface of one of the drums, or to both surfaces, such that there is a uniform distribution of the hydrosol across the entire zone where opposing rotating drum sections will meet in a tangential manner. The hydrosol may be dripped, sprayed, or distributed onto the drum surface in any desired manner and it is not intended to limit the present improved system to any one method of effecting the feeding of the liquid sol to the drawing surfaces.

Various means may be provided for effecting the removal and collection of the fine fibrous filaments as they are drawn between the meeting surfaces; however, again, it is desired that there be the satisfactory continous means for the removal of the fibers in a manner which will not readily break or crush the filaments or fibers during the removal operation. In one aspect there may be provision for a continuous passage of a rod or finger-like means which will pass between the opposing drawing surface in a direction which is transverse with respect to the drawn fibers and thus the removal of the latter from between the surfaces to a zone where there is a depositing or the removal from the projected fibers.

In still another embodiment, the present invention will comprise an apparatus for producing fine drawn inorganic oxide fibers of less than about 25 micron diameter and having a high surface area, which comprises in combination, a pair of rotating drum sections positioned in tangentially abutting relationship, driving means connecting to each of said sections to effect opposite rotation thereof, means of feeding a liquid sol to at least the surface of one drum section whereby both surfaces become wetted and fine filament-like fibers will be drawn from between the drum sections as opposing portions of their surfaces rotate away from one another, spaced and movable fiber collecting means positioned to move adjacent to the juncture of said drum sections and transversely with respect to the rotating surfaces thereof, whereby stretched inorganic oxide fibers will be pulled down from such surfaces, and means for continuously moving said collecting means to provide for continuous fiber pick up.

The rotating drum sections may be narrow or of a considerably extended width such that large quantities of drawn fibers are produced across the entire width of the drum sections in a continuous manner. Various types of projection means may be provided to collect the fibers from the drum surfaces as for example, spokes or finger-like means from a rotating wheel that will move transversely between the opposing tangentially contacting drum section. On the other hand, where the drum sections are of considerable width, then a traveling belt arrangement may be provided to have finger-like projections therefrom to pass transversely across the fibers as they are being formed between the oppositely rotating drum or roller sections.

Reference to the accompanying drawing and the following description thereof will serve to illustrate how the present filament forming system may be carried out as well as set forth additional advantageous features in connection with novel apparatus arrangements which may be used for the forming and collecting of the fibers.

DESCRIPTION OF THE DRAWING

FIG. 1 of the drawing shows diagrammatically, in an elevational view, how hinged plate means may be employed to form drawn fibers and an accompanying movable spoke or arm arrangement used to collect and remove the formed filaments.

FIG. 2 illustrates, in a diagrammatic manner, how oppositely rotating cylinders are utilized to form fine filaments or fibers while a rotating wheel with spoke means is used for effecting the collection and removal of the continuously formed fibers.

FIG. 3 of the drawing illustrates how wide cylinder or roller surfaces, which rotate in opposite directions to form filaments, may make use of an elongated belt and projecting rod arrangement for effecting the continuous collection and removal of the filament-like fibers.

FIG. 4 illustrates a knurled type of surface which may be used on one or more of the rotating drum surfaces as a means for assisting in filament formation under the present continuous filament forming and connection system.

Referring now particularly to FIG. 1 of the drawing there are shown opposing plate members 1 and 2, each of which is hinged at its lower end in a manner to permit the interior faces to substantially meet and then part from one another to form an open V arrangement, such as illustrated. The plate members 1 and 2 may be continuously reciprocated back and forth by the respective rod means 3 and 4 connecting at pivot points 5 and 6. Any suitable power means may be used for reciprocating rods 3 and 4 and have not been shown in the present drawing.

In accordane with the present operating system, the inner faces of the plate members 1 and 2 will be continuously or periodically wetted by the feeding of a hydrosol, such as from supply conduit means 7 having control valve 8, such that there may be a continuous formation of filaments. The hydrosol may be alumina or any other desired inorganic oxide material which can be supplied as a viscous, tacky material capable of being drawn into a fine filament with a desired high surface area. As the hydrosol is applied to the surfaces of plate members 1 and 2, there is the constant closing and opening of the members with respect to their inner faces so as to effect substantial contacts therebetween and then resulting formation of fine filaments or fibers as the two plates are pulled away from one another by the respective rod means 3 and 4. There is apparently an evaporation of fluid from each fiber as the surfaces pull away from each other and thus a resulting flexible, semi-rigid filament.

In order that there may be a continuing formation of a multiplicity of filaments or fibers, there is provided a suitable removal and collection of the filaments from between the inner surfaces of the plate members 1 and 2. Thus, in accordance with the present invention, a projecting rod means such as 9 held by movable wheel or belt means 10, will effect a continuous or periodic transverse movement between the plate members 1 and 2 and pull away and collect all of the filaments that have been formed between the two inner drawing surfaces of plate members 1 and 2.

In a continuously operating system, the inner surfaces of plate members 1 and 2 will thus be continuously reciprocated so as to move towards one another and then be drawn from one another and effect the periodic drawing of filaments or fibers across the space between the two inner surfaces and, at the same time there will be the continuous or a timed periodic movement of the collection rod means 9 transversely across the space between the two inner surfaces of plate members 1 and 2 so as to collect all of the fibers that have been formed at each meeting and drawing operation.

As hereinbefore set forth, the alumina or the particular gellable hydrosol which is being fed to the opposing fiber drawing surfaces shall have a proper viscosity or tackiness to insure the formation of small diameter high surface area filaments. Also the temperature and humidity of the surrounding atmosphere shall be controlled to be within the proper ranges so as to insure the formation of a desired type of small diameter fiber in the proper hydrous state. Although not shown in the present drawing, it is to be understood that the apparatus shown diagrammatically may well be included within a suitable housing or a shell which will insure the maintenance of the proper temperature and humidity conditions and which, in turn, shall provide optimum conditions for the formation of small diameter filaments. The humidity, for example, may be controlled by the continuous introduction of a washed air stream which will envelope the formation zone at a preferred optimum temperature range.

It is to be understood that FIG. 1 is merely diagrammatic and that they hydrosol may be introduced or distributed in any preferred manner to both inner surfaces of plate members 1 and 2 where it is necessary to obtain a uniform distribution of the sol over the entire "drawing" surfaces of each of the plate members. Alternatively, where plate members 1 and 2 are of extended length it may be necessary to have a series of spaced sol distributing means along the width of the plate members to effect the desired optimum distribution of hydrosol to such members.

In the embodiment of FIG. 2 of the drawing, there is shown the use of oppositely rotating cylinder means 11 and 12 which will provide opposing "drawing" surfaces to in turn effect the formation of fine filaments or fibers from an inorganic oxide sol. In the simplified embodiment shown, the cylinder 12 is indicated as being supported on a rod or axle means 13 which in turn is driven by pulley means 14 having a connecting belt 15. Similarly, cylinder 11 is supported from a rod or axle means 16 which may also connect to driving means, or alternatively, may be merely driven by the effect of surface contact when a tacky sol material is supplied to the adjacent surface of cylinder 12. In order to provide proper touching or spacing of the adjacent cylinders 11 and 12, there may be movable or adjustable support means 17 and 18 in turn mounted above base member 19. For example, slotted openings 20 accommodating bolts 21 can provide lateral adjustment of support means 17 and 18 so as to in turn effect a desired spacing between the oppositely rotating surfaces of cylinder means 11 and 12. In lieu of belt drive means 15, there may be flexibility of operation provided by using a motor driven variable speed drive device to effect cylinder rotation. Variations in speed for the drums can be used to advantage to vary filaments diameter or, alternatively, to compensate for differences in sol tackiness.

Various methods of introducing the gellable hydrosol onto the cylinder surfaces may be utilized, however and, as shown diagrammatically, there may be the use of valve adjustment means 22 in a feed conduit 23 so as to provide a desired flow to at least one of the rotating surfaces. The viscosity or tackiness of the sol working between and in conjunction with the oppositely rotating wheel action of the cylinders will result in a pulling and drawing of the sol to form fine fialments of a semi-set sol. As the filaments are drawn or pulled to small diameters there is a transformation from a viscous fluid into a semi-rigid solid which is a flexible filament or fiber that may be collected and removed from between the drawing surface. As set forth in FIG. 1 of the drawing, the formation of the flexible and semi-rigid solid is caused primarily by the evaporation of fluid from the extremely high surface to volume ratio of each drawn filament.

Inasmuch as the present apparatus arrangement provides for continuously rotating cylinder surfaces and for the continuous introduction of sol material to one or more of the surfaces there will be effected a continuous formation of the fine flexible fibers. Also, with the utilization of the present system there is a continuous removal of the filaments as they are being continuously formed. In a simplified embodiment, there may be utilized a continuously rotating wheel means 24 supported from rotating rod means 25 that will have a plurality of spokes or "pick-up" rods 26 capable of moving transversely across the space between the departing faces or surfaces of the drum members 11 and 12. The fibers being continuously picked up are subsequently and periodically removed from the rod means by still other suitable moving rods or by vacuum pickup means (not shown) such that there may be the continuous movement of the wheel 24 and the rod or spoke means 26 across and between the oppositely rotating faces of cylinders 11 and 12 to permit an uninterrupted operation of the entire system. Various types of motor arrangements or power supply units may be utilized to effect the rotation of the cylinders 11 and 12, as well as the shaft 25 for wheel 24 and it is of course not intended to limit the present invention to any one form of power supply means. In a more sophisticated type of design and construction, the present rotating cylinder system may have beans to provide various speeds of rotation for the cylinders, as noted hereinbefore, as well as for the collecting rods 26 from wheel means 24. Also, various types of mechanically operated cutch means may be used to vary the spacing between the rotating cylinders, in lieu of the slotted adjustments for the bolting of stand means 17 and 18 to base 19. Still further, there may be automatic means, including special valve and feed means, to effect the controlled rate of feed for the sol to one or more points along the surface of rotating cylinders 11 and 12.

As is clearly shown in FIGS. 1 and 2 the pick-up rods (9 in FIG. 1; 26 in FIG. 2) penetrate the web of filaments and reach therethrough to a point adjacent the juncture of the drum members, or that point where the surfaces of the opposed drums meet or are closest. The purpose of this is two-fold: to accomplish further drawing of the semi-rigid fibers by pulling action of such rods, and to also perform the primary collecting function of the penetrating rods.

In order that there may be control of the temperature and humidity for the drawn fibers as they are formed from between the drawing surfaces of cylinders 11 and 12 there may be the introduction of a suitable humidified and washed air stream, at a desired temperature level, to the zone of the oppositely rotating drum surfaces. Indicated in the present FIG. 2, is a washed air stream supply conduit 27 having a distributor means 28 which will serve to introduce a humidified and controlled temperature stream to the zone of the drawing surfaces 11 and 12. Also, as stated in connection with FIG. 1 of the drawing, there may be a suitable housing means, shell, closed room, or the like, which will be supplied with a controlled atmosphere for the entire fiber drawing system, whereby to in turn control fiber diameter and other important physical characteristics that may be desired in the production of a particular small diameter, flexible and high surface area refractory filament.

In FIG. 3 of the drawing, there is indicated a modification of the rotating cylinder filament forming system, in that the rotating cylinder means have an extended width and are of the nature of elongated rotating rollers such as 29 and 30, whereby there may be a large quantity of drawn fibers produced in a continuous manner over an elongated drawing surface area. In this instance, the viscous tacky sol is distributed through an elongated perforated pipe 31 arranged in a manner to uniformly spray, or otherwise distribute, the sol over at least one surface of the opposing and oppositely rotating roller means 29 and 30. Still further, in lieu of a rotating wheel arrangement, there is provided an elongated moving belt means 32 which is arranged to pass over end pulley means, such as 33, and carry a multiplicity of projecting fingers or rod means 34. The latter will continuously move between the opposing faces or surfaces of the rollers 29 and 30 in a transverse direction with respect to the filaments that are being drawn between the two oppositely rotating surfaces and thus effect the continuous collection and removal of filaments from the drawing zone. Various means may be provided for effecting the subsequent removal of the collected filaments that will be on the projecting rods 34 as they move transversely between the roller surface 29 and 30. However, in one embodiment, there may be the utilization of vacuum means, such as indicated by vacuum collection nozzle 35 and collection housing 36, to continuously pull off and withdraw filaments from the rod means 34 as such rods travel to one end of the unit. As the rods are cleaned of fibers, they are carried around the pulley means 33 on belt 32 and then returned to the opposing end of the unit for a successive passage between the drawing surfaces.

It is to be understood that various types of power supply units, supporting pulleys, stands or support means, and the like, may be provided in combination with the rollers as well as the traveling belt means 32 and that the present system should not be limited to the use of any one structural arrangement or power supply means. Diagrammatically, there is indicated a variable speed drive unit 40 connecting with drive rod 39 to roller means 30 in order to provide variable control of the fiber drawing system of FIG. 3.

In FIG. 4 of the drawing there is indicated the use of a cylinder or roller means 37 which has a multiplicity of spaced projections or nobs 38 which will in turn assist in providing a non-uniform surface to the roller means and assist in the formation of fibers in a spaced relationship from between the opposing drawing surfaces in the continuously operating system. In other words, by the use of various projections, grooves, or other rough surface means, there may be a controlled spacing for the formation of the fine, flexible fibers between the drawing surfaces in a particular system, as compared with the uncontrolled formation of fibers from oppositely rotating smooth surfaces.

In the actual utilization of an apparatus arrangement similar to that shown in FIG. 2 of the drawing, an alumina sol material was fed in a viscous and tacky state to the surface of a rotating cylinder in a zone where the temperature was of the order of 72° F. and alumina filaments formed which had a diameter in the range of from 2 microns to 20 microns and a high surface area, after calcination at 600° C., of the order of 200 m.$^2$/g. This large surface area was due in part to the small diameter of the filaments but mostly to the fact that the final alumina fiber product was porous after calcination at the 550° to 600° C. temperature range.

We claim as our invention:

1. An apparatus for producing fine drawn inorganic oxide fibers of less than about 25 micron diameter and having a high surface area, which comprises in combination, a pair of rotating drum members positioned in tangentially abutting relationship, driving means connecting to at least one of said members to effect opposite rotation thereof, means feeding a liquid sol to the surface of at least one drum member whereby both surfaces become wetted and fine filament-like fibers will be drawn from between the drum members as opposing portions of their surfaces rotate away from one another, spaced and movable fiber collecting and additional drawing means comprising laterally movable projections positioned to move in between and adjacent the juncture point between said drum members and transversely with respect to the rotating departing surfaces thereof whereby stretched inorganic oxide fibers will be additionally stretched and pulled from such surfaces, and means for continuously moving said collecting means to provide for continuous fiber pickup.

2. The apparatus of claim 1 further characterized in that said projections extend from a rotating wheel whereby there is the continuous transverse passage of projecting rod means to move between the surfaces of said drum section, whereby to remove the filament like fibers.

3. The apparatus of claim 1 further characterized in that said projections are mounted upon a moving belt that in turn is positioned to move transversely between the departing and oppositely rotating surfaces of the rotating drum members, whereby to continuously remove filament like fibers being drawn from between the drum surfaces.

4. The apparatus of claim 1 further characterized in that said driving means includes a variable speed control means to regulate the speed of the rotating drum means.

References Cited
UNITED STATES PATENTS

| | | | |
|---|---|---|---|
| 1,438,231 | 12/1922 | Goodenberger | 264—164 X |
| 2,215,435 | 9/1940 | Hale | 264—142 |
| 2,371,075 | 3/1945 | Spertus | 264—164 |
| 2,385,358 | 9/1945 | Hanson | 264—138 |
| 2,522,526 | 9/1950 | Manning | 264—164 X |
| 2,580,918 | 1/1952 | Horsak | 264—164 |
| 2,908,545 | 10/1959 | Teja | 264—164 X |
| 2,939,177 | 6/1960 | Guentert et al. | 264—143 |
| 3,039,165 | 6/1962 | Old | 264—142 |
| 3,259,939 | 7/1966 | Skalko et al. | 264—176 F U X |
| 3,311,481 | 3/1967 | Sterry et al. | 264—176 F X |
| 3,311,689 | 3/1967 | Kelsey | 264—176 F X |

JULIUS FROME, Primary Examiner

J. H. WOO, Assistant Examiner

U.S. Cl. X.R.

18—1; 65—11